United States Patent
Roeland et al.

(10) Patent No.: US 10,841,214 B2
(45) Date of Patent: Nov. 17, 2020

(54) REUSING A TAG

(71) Applicant: Telefonaktiebolaget LM Ericsson (publ), Stockholm (SE)

(72) Inventors: Dinand Roeland, Sollentuna (SE); Zhang Fu, Stockholm (SE); András Zahemszky, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/301,420

(22) PCT Filed: May 13, 2016

(86) PCT No.: PCT/SE2016/050433
§ 371 (c)(1),
(2) Date: Nov. 13, 2018

(87) PCT Pub. No.: WO2017/196217
PCT Pub. Date: Nov. 16, 2017

(65) Prior Publication Data
US 2019/0190825 A1  Jun. 20, 2019

(51) Int. Cl.
*H04W 36/00* (2009.01)
*H04W 36/32* (2009.01)
(Continued)

(52) U.S. Cl.
CPC .............. *H04L 45/64* (2013.01); *H04L 45/38* (2013.01); *H04L 45/742* (2013.01); *H04L 47/2441* (2013.01); *H04W 64/003* (2013.01)

(58) Field of Classification Search
CPC . H04W 24/02; H04W 36/0072; H04W 36/30; H04W 36/32; H04W 48/16;
(Continued)

(56) References Cited

U.S. PATENT DOCUMENTS

2005/0165917 A1* 7/2005 Le .................... H04L 63/0236
709/220
2008/0291875 A1* 11/2008 Kang ................ H04W 36/0061
370/331

(Continued)

FOREIGN PATENT DOCUMENTS

WO         2016041606 A1     3/2016

OTHER PUBLICATIONS

3GPP TR 23.718 V13.0.0 (Sep. 2015), "Architecture enhancement for flexible mobile service steering," 3rd Generation Partnership Project; Technical Specification Group Services and System Aspects; (Release 13), Sep. 2015; 38 pages.

(Continued)

*Primary Examiner* — Sai Aung
(74) *Attorney, Agent, or Firm* — NDWE LLP

(57) ABSTRACT

A method for reusing a tag. The method is performed in a service function node of a mobile communication network and comprises receiving an uplink packet originating from a wireless device; obtaining at least one tag from the uplink packet, wherein each tag is a name value pair added by a node after the packet leaves the wireless device; and adding the at least one tag to a downlink packet destined for the wireless device, wherein the at least one tag influences how the downlink packet is forwarded.

18 Claims, 6 Drawing Sheets

(51) Int. Cl.
*H04L 12/715* (2013.01)
*H04L 12/851* (2013.01)
*H04L 12/721* (2013.01)
*H04L 12/747* (2013.01)
*H04W 64/00* (2009.01)

(58) Field of Classification Search
CPC ... H04W 84/045; H04W 24/08; H04W 48/20; H04W 72/048; H04W 88/06; H04W 12/06; H04W 16/12; H04W 72/042; H04W 48/12; H04W 64/00
See application file for complete search history.

(56) References Cited

U.S. PATENT DOCUMENTS

| | | | | |
|---|---|---|---|---|
| 2011/0092209 A1* | 4/2011 | Gaal | ..................... | H04W 16/12 |
| | | | | 455/436 |
| 2011/0200013 A1* | 8/2011 | Cheng | ............... | H04W 36/0011 |
| | | | | 370/331 |
| 2011/0319013 A1* | 12/2011 | Jung | .................... | H04B 7/2606 |
| | | | | 455/7 |
| 2012/0164979 A1* | 6/2012 | Bachmann | ............ | H04L 63/164 |
| | | | | 455/411 |
| 2014/0295838 A1* | 10/2014 | Won | ...................... | H04W 60/04 |
| | | | | 455/435.1 |
| 2016/0183156 A1* | 6/2016 | Chin | ................. | H04W 36/0022 |
| | | | | 370/331 |
| 2017/0250917 A1* | 8/2017 | Ruckstuhl | ............. | H04L 45/306 |

OTHER PUBLICATIONS

Haeffner W., et al., "Service Function Chaining Use Cases in Mobile Networks, draft-ietf-sfc-use-case-mobility-06," Apr. 13, 2016, 26 pages.

International Search Report and Written Opinion for Application No. PCT/SE2016/050433, dated Apr. 6, 2017, 28 pages.

Pinczel B., et al., "Towards High Performance Packet Processing for 5G," 2015 IEEE Conference on Network Function Virtualization and Software Defined Network (NFV-SDN), Nov. 2015, 7 pages.

Salaets B., "Advanced Traffic Steering & Optimization Technologies," MENOG 2014, Mar. 2014, 31 pages.

International Preliminary Report on Patentability for International Application No. PCT/SE2016/050433, dated Nov. 22, 2018, 18 pages.

* cited by examiner

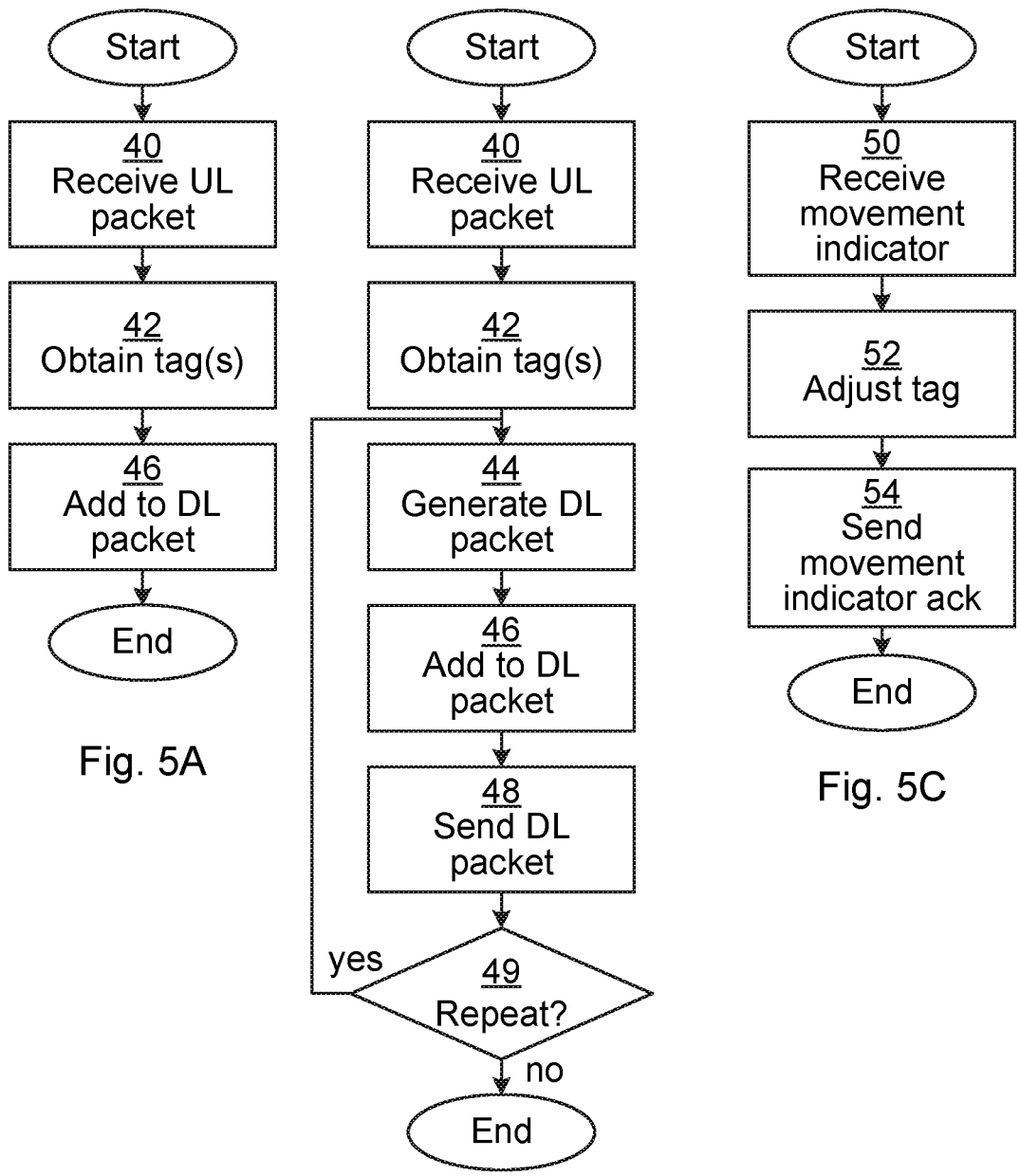

REUSING A TAG

CROSS-REFERENCE TO RELATED APPLICATIONS

This application is a National stage of International Application No. PCT/SE2016/050433, filed May 13, 2016, which is hereby incorporated by reference.

TECHNICAL FIELD

The invention relates to methods, service function nodes, classifier devices, network nodes, for reusing a tag.

BACKGROUND

Currently a number of activities are ongoing to define requirements on the next generation mobile network. One effort is a 5G (Fifth Generation) White Paper by the Next Generation Mobile Networks (NGMN) Alliance. The white paper lists a diverse set of use cases, including IoT (Internet of Things), vehicle-to-vehicle communications, controlling industrial robots, high quality media delivery, etc. These use cases define the requirements for the next generation of mobile networks, where flexibility is one of the key requirements. For each use case, user plane packets should traverse a different sequence of network service function nodes. A 5G core network architecture should offer an infrastructure to support flexibility of organizing such service chains.

Moreover, the wireless devices can be located in different locations in the network. One or more Internet Protocol (IP) Advertisement Points (IAP) are used to forward downlink packets to the wireless device.

However, in some cases, such as for caching, a service function node in the network generates downlink packets which do not originate from outside the network. It would be of great use if forwarding of such downlink packets is made more efficient and would use less resources.

SUMMARY

It is an object to increase efficiency and reduce resource requirements for downlink packet produced within the mobile communication network.

According to a first aspect it is presented a method for reusing a tag. The method is performed in a service function node of a mobile communication network and comprises the steps of: receiving an uplink packet originating from a wireless device; obtaining at least one tag from the uplink packet, wherein each tag is a name value pair added by a node after the packet leaves the wireless device; and adding the at least one tag to a downlink packet destined for the wireless device, wherein the at least one tag influences how the downlink packet is forwarded.

The at least one tag may comprise information indicating a current location of the wireless device.

The at least one tag may comprise information of a radio network node associated with the wireless device.

The at least one tag may comprise information indicating at least one service function to be applied for the downlink packet.

The method may further comprise the step of: sending the downlink packet to be routed to the wireless device.

The method may further comprise, prior to the step of adding the at least one tag, the step of: generating the downlink packet.

The step of generating the downlink packet may be performed as part of a cache functionality of the service function node.

The step of generating may be repeated and the step of adding may be repeated to add the at least one tag for each generated downlink packet.

The method may further comprise the step of: receiving a movement indicator comprising a reference to a target radio network node being associated with the wireless device; and adjusting the at least one tag such that it comprises information of the target radio network node associated with the wireless device in a case of movement of the wireless device from a source radio network node to the target radio network node, resulting in an adjusted tag. In such a case, the step of adding the at least one tag comprises adding the adjusted tag to the downlink packet.

The method may further comprise the step of: sending a movement indicator acknowledgement to the sender of the movement indicator.

According to a second aspect it is presented a service function node for reusing a tag. The service function node is configured to form part of a mobile communication network. The service function node comprises: a processor; and a memory storing instructions that, when executed by the processor, causes the service function node to: receive an uplink packet originating from a wireless device; obtain at least one tag from the uplink packet, wherein each tag is a name value pair added by a node after the packet leaves the wireless device; and add the at least one tag to a downlink packet destined for the wireless device, wherein the at least one tag influences how the downlink packet is forwarded.

The at least one tag may comprise information indicating a current location of the wireless device.

The at least one tag may comprise information of a radio network node associated with the wireless device.

The at least one tag may comprise information indicating at least one service function to be applied for the downlink packet.

The service function node may further comprise instructions that, when executed by the processor, causes the service function node to: send the downlink packet to be routed to the wireless device.

The service function node may further comprise instructions that, when executed by the processor, causes the service function node to, prior to executing the instructions to add the at least one tag, to: generate the downlink packet.

The instructions to generate the downlink packet may form part of a cache functionality of the service function node.

The service function node may further comprise instructions that, when executed by the processor, causes the service function node to repeat the instructions to generate and the instructions to add, to add the at least one tag for each generated downlink packet.

The service function node may further comprise instructions that, when executed by the processor, causes the service function node to: receive a movement indicator comprising a reference to a target radio network node being associated with the wireless device; and adjust the at least one tag such that it comprises information of the target radio network node associated with the wireless device in a case of movement of the wireless device from a source radio network node to the target radio network node, resulting in an adjusted tag. In such a case, the instructions to add the at least one tag comprise instructions that, when executed by the processor, causes the service function node to add the adjusted tag to the downlink packet.

The service function node may further comprise instructions that, when executed by the processor, causes the service function node to: send a movement indicator acknowledgement to the sender of the movement indicator.

According to a third aspect it is presented a service function node comprising: means for receiving an uplink packet originating from a wireless device; means for obtaining at least one tag from the uplink packet, wherein each tag is a name value pair added by a node after the packet leaves the wireless device; and means for adding the at least one tag to a downlink packet destined for the wireless device, wherein the at least one tag influences how the downlink packet is forwarded.

According to a fourth aspect it is presented a computer program for reusing a tag. The computer program comprises computer program code which, when run on a service function node forming part of a mobile communication network causes the service functions node to: receive an uplink packet originating from a wireless device; obtain at least one tag from the uplink packet, wherein each tag is a name value pair added by a node after the packet leaves the wireless device; and add the at least one tag to a downlink packet destined for the wireless device, wherein the at least one tag influences how the downlink packet is forwarded.

According to a fifth aspect it is presented a computer program product comprising a computer program according to the fourth aspect and a computer readable means on which the computer program is stored.

According to a sixth aspect it is presented a method for reusing a tag in a case of movement of a wireless device from a source radio network node to a target radio network node. The method is performed in a classifier device and comprises the steps of: receiving an input movement indicator comprising a reference to the target radio network node being associated with the wireless device; determining all service function nodes being active in tag reuse, wherein each tag is a name value pair that influences how a downlink packet is forwarded; and sending an output movement indicator comprising a reference to the target radio network to each one of the determined service function nodes.

The method may further comprise the steps of: receiving input movement indicator acknowledgements from each one of the determined service function nodes; and sending an output movement indicator acknowledgement to the sender of the input movement indicator only once input movement indicator acknowledgements have been received from all of the determined service function nodes.

According to a seventh aspect it is presented a classifier device for reusing a tag in a case of movement of a wireless device from a source radio network node to a target radio network node. The classifier device comprises: a processor; and a memory storing instructions that, when executed by the processor, causes the classifier device to: receive an input movement indicator comprising a reference to the target radio network node being associated with the wireless device; determine all service function nodes being active in tag reuse, wherein each tag is a name value pair that influences how a downlink packet is forwarded; and send an output movement indicator comprising a reference to the target radio network to each one of the determined service function.

The classifier device may further comprise instructions that, when executed by the processor, causes the classifier device to: receive input movement indicator acknowledgements from each one of the determined service function nodes; and send an output movement indicator acknowledgement to the sender of the input movement indicator only once input movement indicator acknowledgements have been received from all of the determined service function nodes.

According to an eighth aspect it is presented a classifier device comprising: means for receiving an input movement indicator related to movement of a wireless device from a source radio network node to a target radio network node, the input movement indicator comprising a reference to the target radio network node being associated with the wireless device; means for determining all service function nodes being active in tag reuse, wherein each tag is a name value pair that influences how a downlink packet is forwarded; and means for sending an output movement indicator comprising a reference to the target radio network to each one of the determined service function nodes.

According to a ninth aspect it is presented a computer program for reusing a tag in a case of movement of a wireless device from a source radio network node to a target radio network node. The computer program comprises computer program code which, when run on a classifier device causes the classifier device to: receive an input movement indicator comprising a reference to the target radio network node being associated with the wireless device; determine all service function nodes being active in tag reuse, wherein each tag is a name value pair that influences how a downlink packet is forwarded; and send an output movement indicator comprising a reference to the target radio network to each one of the determined service function.

According to a tenth aspect it is presented a computer program product comprising a computer program according to the ninth aspect and a computer readable means on which the computer program is stored.

According to an eleventh aspect it is presented a method for reusing a tag in a case of movement of a wireless device from a source radio network node to a target radio network node. The method is performed in a network node and comprises the steps of: sending a movement indicator comprising a reference to the target radio network node to a service function node being active in tag reuse, wherein each tag is a name value pair that influences how a downlink packet is forwarded; receiving a movement indicator acknowledgement from the service function node; and causing the source radio network node to release resources associated with the wireless device.

The step of sending may comprise sending the movement indicator to a classifier device for forwarding to the service function node. In such a case, the step of receiving the movement indicator acknowledgement comprises receiving the movement indicator acknowledgement from the classifier device.

The method may further comprise the step of: obtaining a list of a plurality of service function nodes being active in tag reuse. In such a case, the step of sending comprises sending the movement indicator to all of the service function nodes being active in tag reuse; the step of receiving comprises receiving a movement indicator acknowledgement from all of the service function nodes.

The method may be performed in the target radio network node.

According to a twelfth aspect it is presented a network node for reusing a tag in a case of movement of a wireless device from a source radio network node to a target radio network node. The network node comprises: a processor; and a memory storing instructions that, when executed by the processor, causes the network node to: send a movement indicator comprising a reference to the target radio network node to a service function node being active in tag reuse, wherein each tag is a name value pair that influences how a downlink packet is forwarded; receive a movement indicator acknowledgement from the service function node; and cause the source radio network node to release resources associated with the wireless device.

The instructions to send may comprise instructions that, when executed by the processor, causes the network node to send the movement indicator to a classifier device for forwarding to the service function node. In such a case, the instructions to receive the movement indicator acknowledgement comprise instructions that, when executed by the processor, causes the network node to receive the movement indicator acknowledgement from the classifier device.

The network node may further comprise instructions that, when executed by the processor, causes the network node to: obtain a list of a plurality of service function nodes being active in tag reuse. In such a case, the instructions to send comprise instructions that, when executed by the processor, causes the network node to send the movement indicator to all of the service function nodes being active in tag reuse; and the instructions to receive comprise instructions that, when executed by the processor, causes the network node to receive a movement indicator acknowledgement from all of the service function nodes.

The network node may be the target radio network node.

According to a thirteenth aspect it is presented a network node comprising: means for sending a movement indicator relating to a case of movement of a wireless device from a source radio network node to a target radio network node comprising a reference to the target radio network node to a service function node being active in tag reuse, wherein each tag is a name value pair that influences how a downlink packet is forwarded; means for receiving a movement indicator acknowledgement from the service function node; and means for causing the source radio network node to release resources associated with the wireless device.

According to a fourteenth aspect it is presented a computer program for reusing a tag in a case of movement of a wireless device from a source radio network node to a target radio network node. The computer program comprises computer program code which, when run on a network node causes the network node to: send a movement indicator comprising a reference to the target radio network node to a service function node being active in tag reuse, wherein each tag is a name value pair that influences how a downlink packet is forwarded; receive a movement indicator acknowledgement from the service function node; and cause the source radio network node to release resources associated with the wireless device.

According to a fifteenth aspect it is presented a computer program product comprising a computer program according to the fourteenth aspect and a computer readable means on which the computer program is stored.

Here now follows a set of definitions of terms used herein.

Uplink is to be construed as a direction from the wireless device towards the network.

Downlink is to be construed as a direction from the network towards the wireless device.

Service function is to be construed as a function in the mobile communication network that processes packets. Processing may include examining a packet (e.g. packet counting), altering a packet (e.g. enriching a URL found in the payload of a packet), dropping packets (e.g. rate shaping), or even generating packets (e.g. a cache). There is no one-to-one relation between input and output packets for a given function. For example, a single input packet may lead to multiple output packets. A service function may add or remove metadata to a packet header. Metadata is information about packet, and is typically consumed by (and removed by) another service function later in the chain. Metadata is treated as opaque information by the network nodes between metadata producer and consumer. As such, metadata does not influence the forwarding decisions made for the packet in the chain.

For example, a DPI service function may set metadata "this packet is part of a voice call flow". That metadata is later used by a charging service function to apply the correct charging for this packet.

Service function node is to be construed as a node performing a service function, which is a function that can be applied for uplink and/or downlink packets in a mobile communication network. The service function can be triggered by a classifier adding a corresponding tag on the packet.

Uplink classifier device is to be construed as a node which determines which service functions should be applied for an uplink packet. The uplink classifier adds a tag to the uplink packet for each service function which should be applied. The tag(s) thus influence how the packet is forwarded. The uplink classifier can be a service function itself, i.e. the uplink classifier device can be a service function node.

Downlink classifier device is to be construed as a node which determines which service functions should be applied for a downlink packet. The downlink classifier device adds a tag to the downlink packet for each service function which should be applied. The tag(s) thus influence how the packet is forwarded. The downlink classifier can be a service function itself, i.e. the downlink classifier device can be a service function node.

Wireless device is to be construed as user device which can be portable or fixed and can communicate over a wireless interface to a mobile communication network. Can e.g. be a mobile phone, smart phone or a tablet/laptop with wireless connectivity. The wireless device can also be referred to as User Equipment (UE).

Packet is to be construed as a data item for communication between a sending device and a receiving device. The packet has a header and a payload. The header includes one or more fields. For example, an IP (Internet Protocol) packet has a field "destination IP address" in the header. The header typically contains information of the destination endpoint of the packet, which is used to ensure that the packet arrives at the correct destination. A packet may traverse one or more service functions. This is called a service function chain.

Tag is to be construed as a name/value pair that may influence the forwarding decisions made for the packet in the remaining part of a service chain. For example, a tag "parental control=yes" may be set for all packets that should pass a service function performing parental control. In a service function chain, a service function may add or remove tags to a packet header.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 5A-C are flow charts illustrating embodiments of methods for reusing a tag performed in a service function node;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein relate to adding tag(s) from an uplink packet to downlink packet(s). In this way, any routing information in uplink packet tag(s) is reused for the downlink packet(s), thus reducing the need for control plane signalling otherwise required to obtain the routing information. Moreover, movement indicators and movement indicator acknowledgements are used when a handover occurs, to ensure current routing information is available to the service function node.

Figure 1:
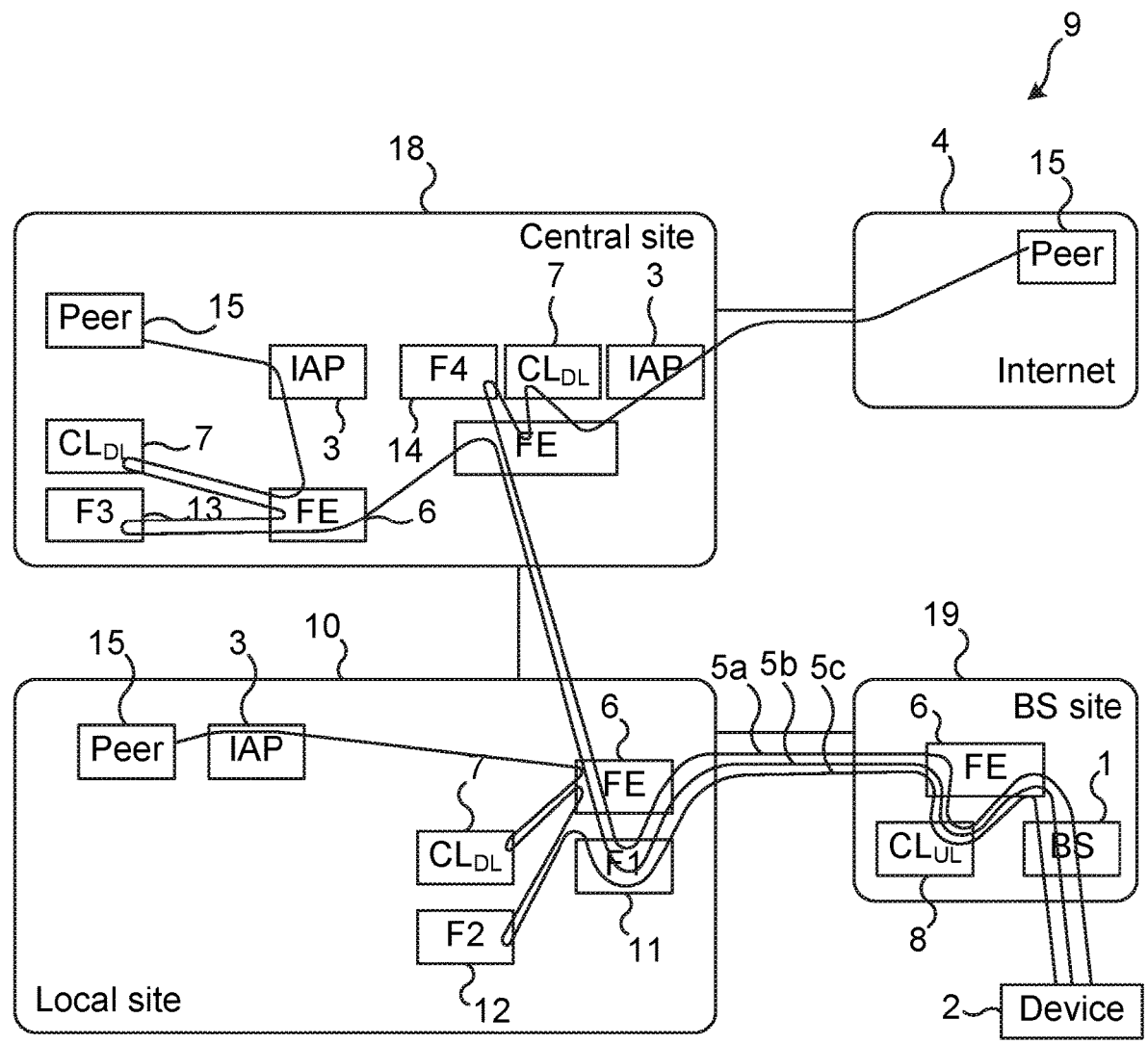
FIG. 1 is a schematic diagram illustrating an environment in which embodiments presented herein can be applied.

FIG. 1 is a schematic diagram illustrating an environment in which embodiments presented herein can be applied. A mobile communication network 9 is shown which can be applied for 5G. There is a central site 18, a local site 10 and a base station (BS) site 19. The central site 18 can be connected to the Internet 4. Respective user service nodes 15 are provided in each one of the Internet 4, the central site 18 and the local site 10. Each user service node is a node providing any type of user service for the wireless device. The user service nodes 15 correspond to each other. Each user service node 15 is thus a node providing a user service for a wireless device.

The base station site 19 comprises a radio network node 1, a forwarding entity 6 and an uplink classifier. The radio network node 1 can be an evolved Node Bs, also known as eNode Bs or eNBs. The radio network node 1 could also be in the form of Node Bs, BTSs (Base Transceiver Stations) and/or BSSs (Base Station Subsystems), access point, etc. as long as the principles described herein are applicable.

The radio network node 1 provides radio connectivity over a wireless interface to a plurality of wireless devices 2. The term wireless device 2 is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless terminal 2 can comprise a number of wires for internal and/or external purposes.

The mobile communication network 9 may e.g. comply with any suitable communication standard, e.g. any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, uplink (UL) communication occurs from the wireless device 2 to the network side and downlink (DL) communication occurs from the network towards the wireless device 2. The quality of the wireless radio interface to each wireless device 2 can vary over time and depending on the position of the wireless device 2, due to effects such as fading, multipath propagation, interference, etc.

It is to be noted that the mobile communication network 9 can comprise any suitable number of BS sites 19, local sites 10 and central sites 18.

A control plane (CP) (not shown) contains all control plane logic for controlling traffic in the network, allowing for a strict separation between control and user plane.

The user plane contains three types of function nodes: Forwarding Element (FE) 6, service function nodes (SFN) 11-14 and Internet Protocol (IP) Advertisement Point (IAP) 3.

An FE 6 forwards each packet to one of its ports based on rules it has received from the CP. An FE 6 may forward a packet through one or more SFNs 11-14. An FE 6 is only concerned with the actual forwarding; it does not classify or modify a packet. It is to be noted, however, that the FE and a classifier can optionally be combined in a single physical device.

An SFN is a service function that processes user plane packets, UL and/or DL. Processing may include altering the packet's payload and/or packet header. SFNs are not expected to know topological information regarding the chain, including which other SFNs are in the chain and how to reach them. An SFN may serve multiple users, and may or may not keep user-specific data. We call such user-specific data context herein. Context data is thus data relating to a user and/or a session with a particular wireless device (user). An SFN can be used for any suitable purpose, e.g. caching, billing, priority handling, routing, etc. Hence, an SFN is a node implementing a service function, where the service function is a function which can be applied for UL and/or DL packets in the mobile communication network.

The service function is triggered by a classifier adding a corresponding tag on the packet, instructing the FE where to forward the packet.

The IAP 3 is a component used to achieve an anchorless network; i.e. a network without a mobility anchor point. An IAP 3 advertises a range of IP (Internet Protocol) addresses/prefixes towards an outer IP network, such as the Internet 4 or an operator-internal network. A single IP address/prefix may be advertised by multiple IAPs 3. If the IP address of a specific wireless device 2 is advertised by multiple IAPs 3, then packets for that wireless device 2 can enter the network via any of those IAPs 3. Similarly, an anchored approach can be achieved by allowing only a single IAP 3 to advertise the IP address for that wireless device 2. The CP contains a Location Registry (LR). This is a table of entries, where each entry is a mapping from the IP address/prefix of a wireless device 2 to a current location of the wireless device 2. The latter is e.g. encoded as a base station identifier (ID).

When a wireless device 2 moves from one BS to another, the CP ensures that the LR is updated with the new location. Location can e.g. be Base Station ID (BS ID) or a first service function used. An IAP 3 is only used for DL packets heading towards the wireless device 2. For each DL packet, the IAP 3 performs a number of operations: 1) Query the LR based on the destination IP address of the packet in order to retrieve BS ID; 2) Tag the packet with BS ID; 3) Forward the packet via an FE 6 to the first SFN in the service chain as indicated in the LR reply. The concept of tagging is explained in more details below. Note that the LR can be implemented in an optimized fashion. E.g. the IAP 3 query may be performed towards an IAP internal cache. Only if no entry is found in that cache, the LR is queried. For non-mobile devices, implementing the query is simplified as the entry in the LR for that wireless device 2 will not change.

Now the concept of service chaining will be explained. FEs 6 forward packets to different SFNs and BSs 1 according to which service chain the packets need to traverse and where the corresponding devices are located. Such information for routing the packet is added to the packet as tags by the classifiers. Hence, a tag is a name/value pair that may influence the forwarding decisions made for the packet in the remaining part of a service chain. For example, a tag "parental control=yes" may be set for all packets that should pass a service function performing parental control. In a service function chain, a service function may add or remove tags to a packet header.

A classifier (CL) is a SFN that determines which service chain a packet takes based on the packet header and rules it has received from the CP. A CL may change the packet's header, e.g. adding a tag to indicate which service chain the packet traverses. A CL may contact the CP when a packet cannot be classified, or it may drop such packet.

There are both UL classifiers $CL_{UL}$ 8 and DL classifiers $CL_{DL}$ 7. There is at least one UL classifier $CL_{UL}$ 8 and one DL classifier $CL_{DL}$ 7 in the network 9 which classify the traffic from the devices and to the devices, respectively. Classifiers could be at branching points or at an endpoint of the chain, e.g. early in the chain; e.g. the $CL_{UL}$ 8 is at the base station site 19 and the $CL_{DL}$ 7 can be co-located with the IAP 3.

FEs 6 forward packets according to tags in the packets. Tags can be logically expressed with a name/value pair. A packet may have one or more tags. There are multiple ways to carry tags in packets. For instance, tags can be encoded as Virtual Local Area Networks (VLANs), or a tunnelling protocol where a variable number of tags can be carried as meta-information. In certain cases, an existing protocol element can act as tag value; e.g. an IP address can act as a wireless device ID. Regarding the implementation, the FEs 6 can be implemented as OpenFlow switches, given that OpenFlow is a communications protocol that gives access to the forwarding plane of a network switch or router over the network. OpenFlow supports multiple tags and also multiple flow tables. Alternatively, the FEs 6 and SFNs can be implemented as virtualized network entities running on general-purpose hardware.

An SFN handles a collection of flows. The definition of flows is kept flexible and can be configured by the CP depending on the use case. Examples of flows include: packets with the same IP 5-tuple, all packets to/from a specific BS. IP 5-tuple is a collection of session parameters being one way of defining a communication session. Specifically, the IP 5-tuple contains source IP address, source port, destination IP address, destination port, protocol (e.g. TCP (Transport Control Protocol), UDP (User Datagram Protocol), etc.). The protocol is optionally implicit (e.g. TCP), whereby only the four remaining session parameters are sufficient to define a communication session. Hence, the session is a link used for communication and can be defined by communication details as explained above.

An FE 6 may forward a packet through one or more SFNs 11-14. An FE 6 is only concerned with the actual forwarding; it does not classify or modify a packet. It is to be noted, however, that the FE and a classifier can optionally be combined in a single physical device.

Putting it all together, an UL packet would traverse the BS 1 and one or more FEs 6. Each FE 6 may forward the packet via one or more SFNs (including the UL classifier 8). Similarly, a DL packet would traverse the IAP 3, one or more FEs 6, where each FE 6 can forward the packet to one or more SFNs (including the DL classifier 7) and a BS 1. In both UL and DL, at least one SFN acts as a classifier.

There may be one chain of functions for traffic towards the user service node 15 at the local site 10 and one chain for traffic towards the Internet 4. Both chains may have segments in common. The functions may be spread out across the topology. A first chain 5a, being a chain to the user service node 15 on the Internet 4, involves the use of a first SFN 11 at the local site 10 and a second SFN 12 at the central site 18. For instance, the first SFN 11 could be a bandwidth limiter, and the second SFN 12 could be a caching function. A second chain 5b, being a chain to the user service node 15 at the central site 18, involves the use of the first SFN 11 and a third SFN 13, where the third SFN may perform simple charging.

It is to be noted that the chains 5a-c in FIG. 1 are simplified with regards to UL and DL symmetry. The chaining concept itself allows certain SFNs only to be traversed in one direction; e.g. the UL classifier 8 only in the UL.

Figure 2:
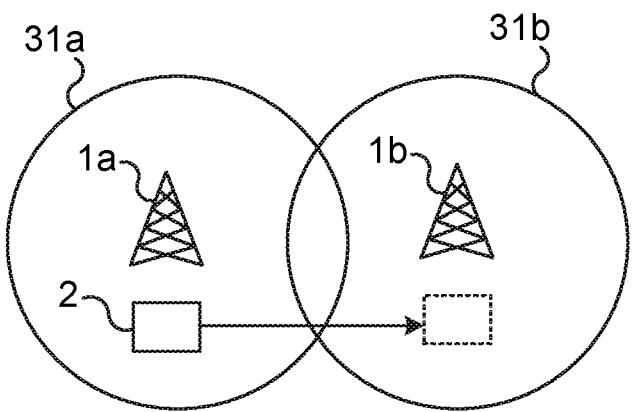
FIG. 2 is a schematic diagram illustrating a handover procedure which can be applied in the environment of FIG. 1.

FIG. 2 is a schematic diagram illustrating a handover procedure which can be applied in the environment of FIG. 1. In this example, there are two radio network nodes 1a-1b. The first radio network node 1a provides coverage in a first cell 31a and the second radio network node 1b provides coverage in a second cell 31b.

Here, the wireless device 2 is in motion from the first cell 31a to the second cell 31b. This triggers a handover from the first radio network node 1a to the second radio network node 1b. In the handover process, the first radio network node 1a is called a source radio network node and the second radio network node 1b is called a target radio network node.

Figure 3:
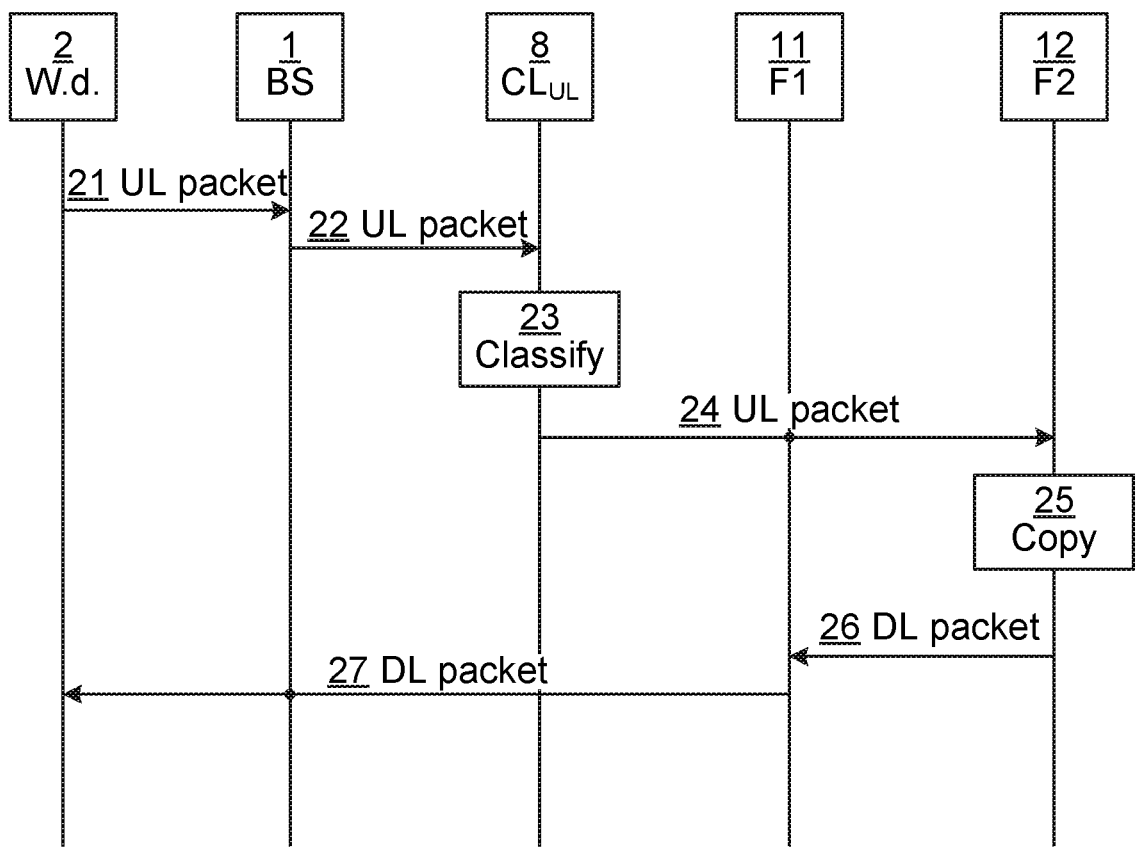
FIGS. 3 and 4 are sequence diagrams illustrating communication between various entities of embodiments which can be applied in the environment of FIG. 1.
Figure 4:
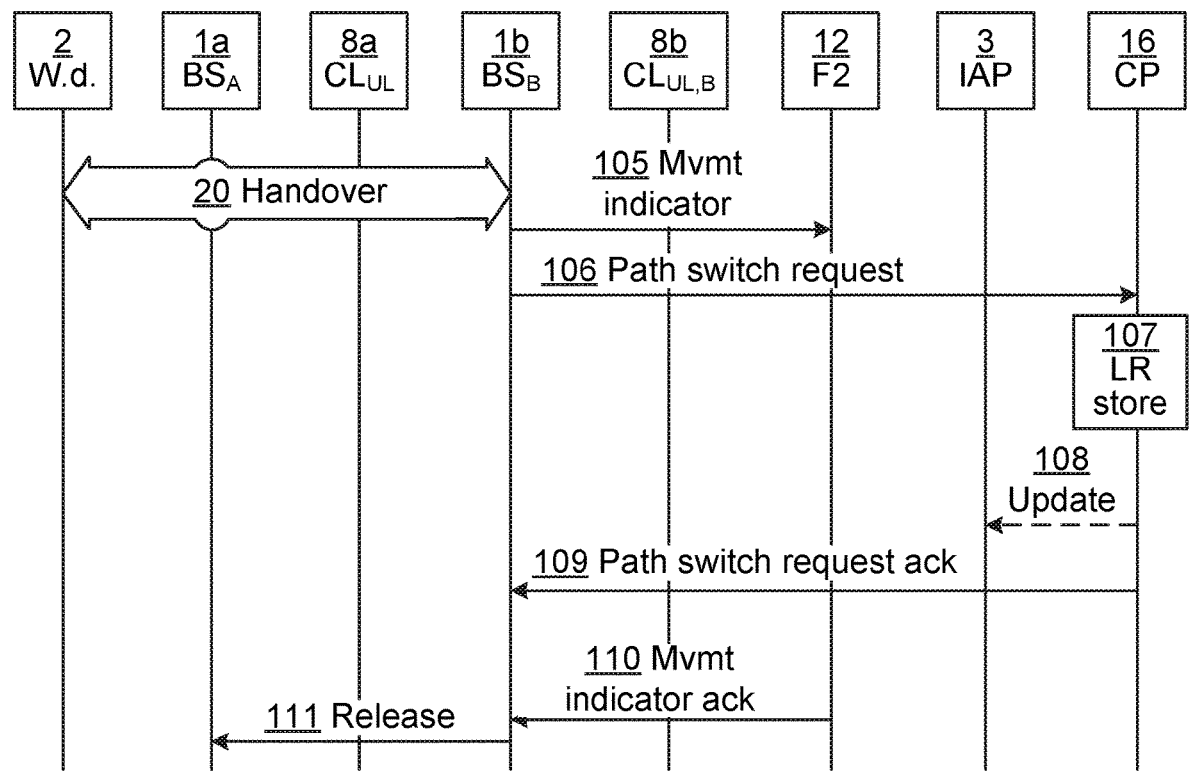

FIGS. 3 and 4 are sequence diagrams illustrating communication between various entities of embodiments which can be applied in the environment of FIG. 1. The entities with a reference numeral with a suffix 'A' are located in association with, or at, a source site of a handover. The entities with a reference numeral with a suffix 'B' are located in association with, or at, a target site of a handover.

Looking first to FIG. 3, this sequence starts by the wireless device 2 sending an UL packet 21 to the radio network node 1. The radio network node 1 sends a corresponding UL packet 22 to the UL classifier device 8. The UL classifier device 8 determines which service functions should be applied for the UL packet in a classification process 23. The UL classifier 8 then adds a tag to the UL packet for each service function which should be applied. The tag(s) thus influence how the packet is forwarded. In this example, the UL packet is classified to be forwarded to a second service function node 12, via a first service function node 11. Alternatively or additionally, a single tag can be defined such that is causes the packet to pass through a chain of multiple service functions.

Once the classification 23 is done, the UL packet 24 is forwarded to the second service function node 12.

According to embodiments herein, the service function node in question, in this example the second service function node 12, copies the tag(s) from the UL packet 24 to a DL packet 26 before the DL packet 26 is transmitted. In this example, the DL packet 26 is here transmitted to the first service function node 11, which may apply processing of the DL packet 26 and send a corresponding DL packet 27 towards the wireless device 2.

By adding the tag(s) of the UL packet to the DL packet, any routing information of the UL packet can be utilised immediately for routing the DL packet. The routing information may be such that it only influences forwarding the DL packet or the routing information can influence both forwarding of the DL packet and the UL packet. In many cases, this reduces or eliminates the need to obtain routing information (such as associated radio network node) from another network node using control plane signalling. This increases efficiency and reduces resource requirements for the routing of the DL packet. This is especially true for a DL packet which is generated by the service function node itself.

Looking now to FIG. 4, this sequence describes how a handover is treated. The handover 20 occurs of the wireless device 2 from the source radio network node 1a to the target radio network node 1b.

A network node in the system, in this case the target radio network node 1b, sends a movement indicator 105 to any service function nodes which apply the tag copying, in this case the second service function node 12. The movement indicator 105 indicates that the wireless device is handed over to the target radio network node 1b. In this way, the second service function node 12 can modify downlink packets to include the target radio network node 1b in any applicable tags of future downlink packets. This prevents the second service function node 12 from adding a tag indicating the source radio network node after the handover.

The target radio network node 1b also sends a path switch request 106 to the control plane 15 which stores 107 the new location (i.e. target radio network node 1b) in a location register (LR). Also the IAP 3 is updated 108. Once this is done, the control plane 16 sends a path switch request acknowledgement 109 to the target radio network node 1b.

It is to be noted that the path switch request 106 can equally well be sent prior to sending the movement indicator 105.

When the second service function node 12 has performed appropriate action, such as adjusting any tag with indicating associated radio network node of the wireless device, due to the movement of the wireless device, the second service function node 12 sends a movement indicator acknowledgement 110 to the sender of the movement indicator 105, in this case the target radio network node 1b.

It is to be noted that the path switch request ack 109 can equally well be sent after the movement indicator ack 110.

When the target radio network node 1b has received the movement indicator acknowledgement 110, it can cause the source radio network node 1a to release its resources associated with the wireless device 2.

FIGS. 5A-C are flow charts illustrating methods for reusing a tag performed in a service function node. First, the method of FIG. 5A will be described.

In a receive UL packet step 40, an UL packet is received. The UL packet originates from a wireless device, but does not need to be received directly from the wireless device.

In an obtain tag(s) step 42, at least one tag is obtained from the UL packet. As explained above, each tag is a name value pair added by a node after the packet leaves the wireless device.

The at least one tag can comprise information indicating a current location of the wireless device, e.g. in the form of information of a radio network node associated with the wireless device, or an anchor associated with the wireless device. In other words, the embodiments presented herein can be, but do not need to be, applied to an anchorless environment.

The at least one tag comprises information indicating at least one service function to be applied for the downlink packet. In this way, the UL classifier can apply tag(s) to control the service function(s) applied for the DL packet, when the tag(s) are copied to the downlink packet.

In an add to DL packet step 46, the at least one tag is added to a DL packet destined for the wireless device. The at least one tag influences how the downlink packet is forwarded.

By adding the tag(s) of the UL packet to the DL packet, any routing information of the UL packet can be utilised immediately for routing the DL packet. The routing information may be such that it only influences forwarding the DL packet or the routing information can influence both forwarding of the DL packet and the UL packet. In many cases, this reduces or eliminates the need to obtain routing information (such as associated radio network node) from another network node using control plane signalling. This increases efficiency and reduces resource requirements for the routing of the DL packet. This is especially true for a DL packet which is generated by the service function node itself.

In this way, one or more tags from the UL packet is copied to the DL packet.

Looking now to FIG. 5B, only new or modified steps compared to FIG. 5A will be described.

In an optional generate DL packet step 44, the DL packet is generated. This can be performed as part of a cache functionality of the service function node. Alternatively, this packet generation can be performed as part of TCP optimiser functionality.

In an optional send DL packet step 48, the DL packet is sent to be routed to the wireless device.

In an optional conditional repeat step 49, it is determined whether to repeat packet generation. This can e.g. be based upon whether the generation of packets can occur with no further input, e.g. if a cache is ready to continue generating DL packets. For instance, a single UL packet (e.g. request or TCP acknowledgement) can result in many DL packets generated by the service function node when this acts as a cache. If a repeat is to be performed, the method returns to the generate DL packet step 44. Otherwise, the method ends.

Looking now to FIG. 5C, this illustrates an optional sequence of steps which can be performed in the service function node in parallel to the methods illustrated in FIGS. 5A-5B.

In an optional receive movement indicator step 50, a movement indicator is received. The movement indicator comprises a reference to a target radio network node being associated with the wireless device. The movement indicator can be a user plane packet. The movement indicator contains an indication that it is a movement indicator, an indication of the sender, a reference to the wireless device it concerns and a destination, i.e. the service function node in question.

In an optional adjust tag(s) step 52, the at least one tag is adjusted such that it comprises information of the target radio network node associated with the wireless device, resulting in an adjusted tag. This is performed in a case of movement of the wireless device from a source radio network node to the target radio network node. In this way, if the service function node generates several DL packets with tags from a single UL packet (such as in a cache), the tags are updated with the target radio network node. If this tag adjustment is not done, the service function node would continue to send DL packets to the source radio network node, whereby such DL packets would never reach the wireless device since it has moved on to the target radio network node.

When step 52 is performed, the add to DL packet step 46 comprises adding the adjusted tag to the DL packet.

In an optional send movement indicator ack step 54, a movement indicator acknowledgement is sent to the sender of the movement indicator. In this way, the sender of the movement indicator is made aware of the service function node having adjusted its tag(s). The movement indicator acknowledgement can be a user plane packet. The movement indicator acknowledgement contains an indication that it is a movement indicator acknowledgement, an indication of the sender (the service function node in question), a reference to the wireless device it concerns and a destination, i.e. the sender of the movement indicator.

Figure 6A:
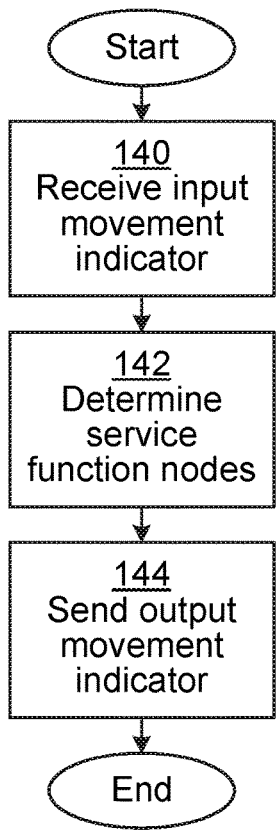
FIGS. 6A-B are flow charts illustrating embodiments of methods for reusing a tag performed in a classifier device.
Figure 6B:
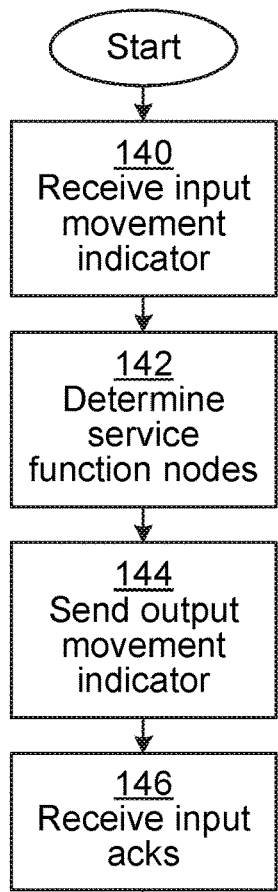

FIGS. 6A-B are flow charts illustrating methods for reusing a tag performed in a classifier device. This method is performed in a case of movement of a wireless device from a source radio network node to a target radio network node. The classifier device can be an uplink classifier device.

In this method, the situation when there are multiple service function nodes that perform the uplink-to-downlink tag copying. The classifier device then ensures that every relevant service function node receives the movement indicator.

First, the method of FIG. 6A will be described.

In a receive input movement indicator step 140, an input movement indicator is received. The input movement indicator comprises a reference to the target radio network node being associated with the wireless device.

In a determine service function nodes step 142, all service function nodes being active in tag reuse are determined. As explained above, each tag is a name value pair that influences how the DL packet (and optionally also the UL packet) is forwarded. The service function nodes can be determined based on rules that the classifier device receives from the control plane. Such rule could e.g. be "If the incoming packet is a movement indicator, then forward this packet to [SFNx, SFNy, SFNz]". The control plane can generate the rule based on information in the repository of service function nodes. Each service function node is described by properties, and one property could be "This SF performs uplink-to-downlink tag copying". Additionally, the classifier device could further check for each SF in the list if it really is in one of the chains of the particular device. This could be done by checking against the other rules that the classifier device would use to forward other packets. If a particular SF is not in any chain of this device, then the movement indicator does not need to be sent to that particular SF.

In a send output movement indicator step 144, an output movement indicator to each one of the determined service function nodes. The output movement indicator comprises a reference to the target radio network node.

In case there is no SFN that performs uplink-to-downlink tag copying, then the classifier device would not forward any movement indicator. This can be an issue, since then the source radio network node would never receive the movement indicator acknowledgement. There are at least three solutions to this situation.

1. The classifier device could send the movement indicator acknowledgement itself to the source radio network node.

2. The control plane can foresee the situation where no SFN performs tag copying. Upon attachment of the wireless device, the CP can inform the source radio network node if this wireless device requires the movement indicator solution at all. If not, the radio network node would never send a movement indicator at all. In other words, the radio network node only sends the movement indicator if there is at least one SF for this device doing tag copying. The indication in the radio network node whether or not the movement indicator solution applies to this wireless device is sent to the radio network node upon handover.

3. The indication to send a movement indicator or not could be sent to the radio network node in the path switch request acknowledgement. In that scenario, the movement indicator is never sent before the path switch request acknowledgement has been received.

Looking now to FIG. 6B, only new or modified steps compared to FIG. 6A will be described.

In an optional receive input acks step 146, input movement indicator acknowledgements is received from each one of the determined service function nodes.

In an optional send output ack step 148, an output movement indicator acknowledgement is sent to the sender of the input movement indicator. This is performed only once input movement indicator acknowledgements have been received from all of the determined service function nodes. In this way, the sender of the input movement indicator is assured that all service function nodes have acknowledged the movement indicator.

Figure 7A:
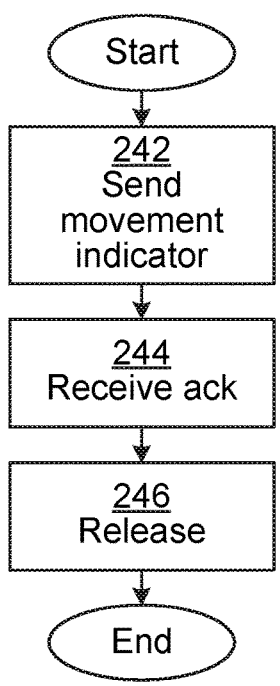
FIGS. 7A-B are flow charts illustrating embodiments of methods for reusing a tag performed in a network node.
Figure 7B:
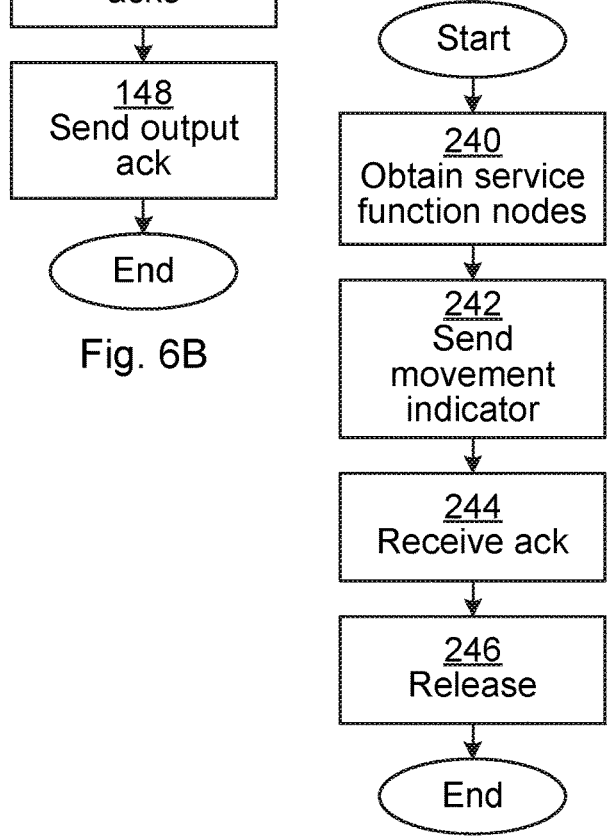

FIGS. 7A-B are flow charts illustrating methods for reusing a tag performed in a network node. This method is performed in a case of movement of a wireless device from a source radio network node to a target radio network node. First, the method of FIG. 7A will be described. The network node can be any network node in the mobile communication network which is made aware of the handover from the source radio network node to the target radio network node. For instance, the network node can be the source radio network node, the target radio network node, a core network node, a downlink classifier, an uplink classifier, a service function node, etc.

In a send movement indicator step 242, a movement indicator is sent to a service function node being active in tag reuse. The movement indicator comprises a reference to the target radio network node. As explained above, each tag is a name value pair that influences how the DL packet (and optionally also the UL packet) is forwarded.

For instance, the movement indicator can be sent to a classifier device for forwarding to one or more service function nodes.

In a receive ack step 244, a movement indicator acknowledgement is received, originating from the service function node(s). For instance, the movement indicator acknowledgement can be received from the classifier device as an intermediate device.

In a release step 246, the network node causes the source radio network node to release resources associated with the wireless device.

Looking now to FIG. 7B, only new or modified steps compared to FIG. 7A will be described.

In an optional obtain service function nodes step 240, a list of a plurality of service function nodes being active in tag reuse is obtained. This list can be received from the control plane, e.g. in a path switch request ack, when present. Alternatively, the classifier device adds a sequence number to each movement indicator. For instance, if the classifier device forks the movement indicator to three service function nodes, then the movement indicators could be numbered as "this is movement indicator 1 out of 3", "this is movement indicator 2 out of 3", etc., allowing the network node can deduce how many movement indicators to wait for.

All of this information can be added to the packets as tags and/or as payload data, as long as the classifier device and the service function node can interpret the information.

When this step is performed, the send movement indicator step 242 comprises sending the movement indicator to all of the service function nodes being active in tag reuse. Moreover, the receive ack step 244 then comprises receiving a movement indicator acknowledgement from all of the service function nodes of the list. Only when all these movement indicator acknowledgements have been received can the method proceed to the release step 246.

Figure 8:
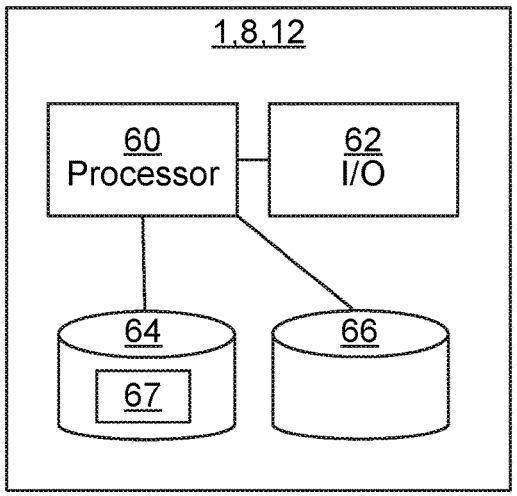
FIG. 8 is a schematic diagram illustrating components of any one of the service function nodes, classifier devices or network nodes of FIG. 1, here represented by a single device.

FIG. 8 is a schematic diagram illustrating components of any one of the service function nodes, classifier devices or network nodes of FIG. 1, here represented by a single device. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the methods described with reference to FIGS. 5A-C, FIGS. 6A-B or FIGS. 7A-B above. The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 6o. The data memory 66 can be any combination of read and write memory (RAM) and read only memory (ROM).

The device further comprises an I/O interface 62 for communicating with other external entities. Optionally, the I/O interface 62 also includes a user interface.

Other components of the device are omitted in order not to obscure the concepts presented herein.

Figure 9:
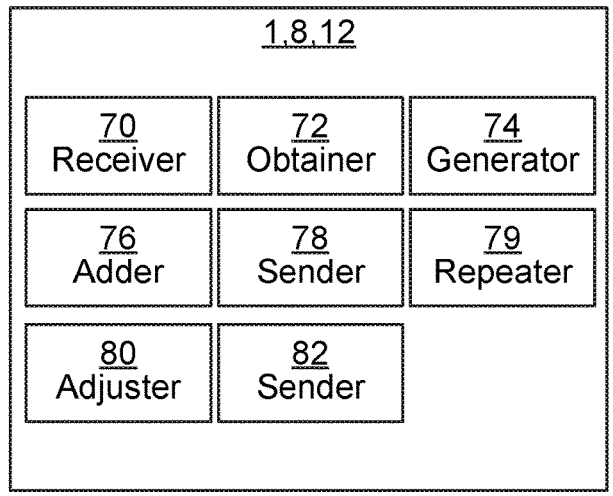
FIG. 9 is a schematic diagram showing functional modules of any one of the service function nodes of FIG. 1 here represented by a single service function node.

FIG. 9 is a schematic diagram showing functional modules of any one of the service function nodes of FIG. 1 here represented by a single service function node. The modules are implemented using software instructions such as a computer program executing in the SFN. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A-C.

A receiver 70 corresponds to steps 40 and 50. An obtainer 72 corresponds to step 42. A generator 74 corresponds to step 44. An adder 76 corresponds to step 46. A sender 78 corresponds to steps 48 and 54. A repeater 79 corresponds to step 49. An adjuster 80 corresponds to step 52. A sender 82 corresponds to steps 48 and 54.

Figure 10:
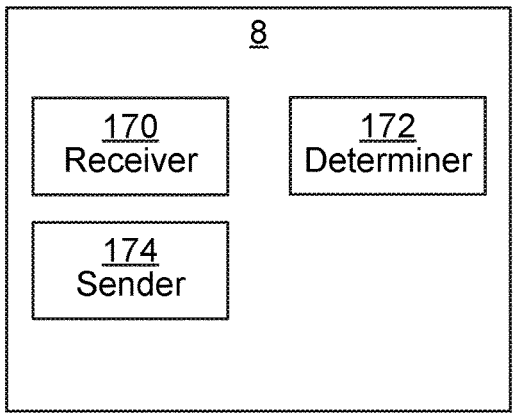
FIG. 10 is a schematic diagram showing functional modules of any one of the classifier devices of FIG. 1 here represented by a single classifier device.

FIG. 10 is a schematic diagram showing functional modules of any one of the classifier devices of FIG. 1 here represented by a single classifier device. The modules are implemented using software instructions such as a computer program executing in the classifier device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A receiver 170 corresponds to steps 140 and 146. A determiner 172 corresponds to step 142. A sender 174 corresponds to steps 144 and 148.

Figure 11:
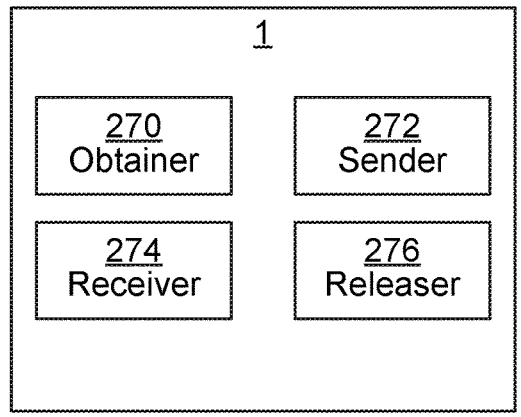
FIG. 11 is a schematic diagram showing functional modules of any one of the network nodes of FIG. 1 here represented by a single network node.

FIG. 11 is a schematic diagram showing functional modules of any one of the network nodes of FIG. 1 here represented by a single network node. The modules are implemented using software instructions such as a computer program executing in the network node. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 7A and 7B.

An obtainer 270 corresponds to step 240. A sender 272 corresponds to step 242. A receiver 274 corresponds to step 244. A releaser 276 corresponds to step 246.

Figure 12:
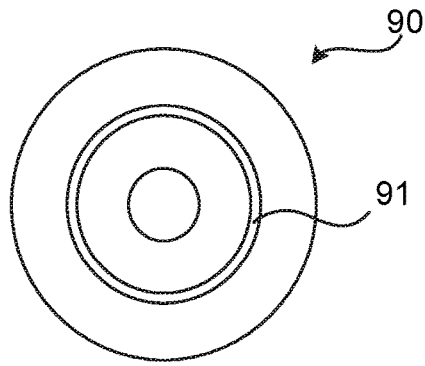
FIG. 12 shows one example of a computer program product comprising computer readable means.

FIG. 12 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for reusing one or more tags, the method being performed in a service function node of a mobile communication network comprising:

receiving an uplink packet originating from a wireless device, wherein the uplink packet includes at least one tag identifying a service function to be performed based on the uplink packet;

obtaining the at least one tag from the uplink packet based on the service function to be performed in the service function node, wherein each tag of the at least one tag is a name value pair added by a classifier node after the uplink packet leaves the wireless device;

copying the at least one tag for reuse with a downlink packet destined for the wireless device in response to the uplink packet, wherein the copied at least one tag influences forwarding of the downlink packet to the wireless device;

receiving a movement indicator comprising a reference to a target radio network node being associated with the wireless device; and adjusting the at least one tag to include information of the target radio network node associated with the wireless device for movement of the wireless device from a source radio network node to the target radio network node, resulting in an adjusted tag.

2. The method according to claim 1, wherein the at least one tag comprises information indicating a current location of the wireless device.

3. The method according to claim 2, wherein the at least one tag comprises information of a radio network node associated with the wireless device.

4. The method according to claim 1, wherein the at least one tag comprises information indicating at least one service function to be applied for the downlink packet.

5. The method according to claim 1, further comprising: sending the downlink packet to be routed to the wireless device.

6. The method according to claim 1, wherein prior to copying the at least one tag, the method further comprising: generating the downlink packet.

7. The method according to claim 6, wherein the generating the downlink packet is performed as part of a cache functionality of the service function node.

8. The method according to claim 6, wherein the generating is repeated at least once and the copied at least one tag is added to each generated downlink packet.

9. The method according to claim 1, further comprising: sending a movement indicator acknowledgement to a sender of the movement indicator.

10. A service function node for reusing one or more tags, the service function node being configured to form part of a mobile communication network, the service function node comprising:

a processor; and a memory storing instructions which, when executed by the processor, cause the service function node to:

receive an uplink packet originating from a wireless device, wherein the uplink packet includes at least one tag identifying a service function to be performed based on the uplink packet;

obtain the at least one tag from the uplink packet based on the service function to be performed in the service function node, wherein each tag of the at least one tag is a name value pair added by a classifier node after the uplink packet leaves the wireless device;

copy the at least one tag for reuse with a downlink packet destined for the wireless device in response to the uplink packet, wherein the copied at least one tag influences forwarding of the downlink packet to the wireless device;

receive a movement indicator comprising a reference to a target radio network node being associated with the wireless device; and adjust the at least one tag to include information of the target radio network node associated with the wireless device for movement of the wireless device from a source radio network node to the target radio network node, resulting in an adjusted tag.

11. The service function node according to claim 10, wherein the at least one tag comprises information indicating a current location of the wireless device.

12. The service function node according to claim 11, wherein the at least one tag comprises information of a radio network node associated with the wireless device.

13. The service function node according to claim 10, wherein the at least one tag comprises information indicating at least one service function to be applied for the downlink packet.

14. The service function node according to claim 10, wherein the instructions further cause the service function node to:

send the downlink packet to be routed to the wireless device.

15. The service function node according to claim 10, wherein the instructions further cause the service function node to:

generate the downlink packet, prior to copying the at least one tag for reuse with the downlink packet.

16. The service function node according to claim 15, wherein generation of the downlink packet form part of a cache functionality of the service function node.

17. The service function node according to claim 15, wherein the instructions further cause the service function node to repeat generation of the downlink packet and add the copied at least one tag for each generated downlink packet.

18. A non-transitory computer readable storage medium having stored there on computer program code which, when run on a processor of a service function node forming part of a mobile communication network, causes the service functions node to perform operations comprising:

receiving an uplink packet originating from a wireless device, wherein the uplink packet includes at least one tag identifying a service function to be performed based on the uplink packet;

obtaining the at least one tag from the uplink packet based on the service function to be performed in the service function node, wherein each tag of the at least one tag is a name value pair added by a classifier node after the uplink packet leaves the wireless device;

copying the at least one tag for reuse with a downlink packet destined for the wireless device in response to the uplink packet, wherein the copied at least one tag influences forwarding of the downlink packet to the wireless device;

receiving a movement indicator comprising a reference to a target radio network node being associated with the wireless device; and adjusting the at least one tag to include information of the target radio network node associated with the wireless device for movement of the wireless device from a source radio network node to the target radio network node, resulting in an adjusted tag.

* * * * *